(No Model.) 5 Sheets—Sheet 1.

O. B. PECK.
PROCESS OF SEPARATING POWDERED OR FINELY DIVIDED PARTICLES.

No. 479,953. Patented Aug. 2, 1892.

Witnesses:
Inventor:
Orrin B. Peck,
By Banning & Banning & Payson,
Att'ys (No Model.) 5 Sheets—Sheet 2.

O. B. PECK.
PROCESS OF SEPARATING POWDERED OR FINELY DIVIDED PARTICLES.

No. 479,953. Patented Aug. 2, 1892.

Witnesses:
Chas. E. Gaylord,
Clifford H. White.

Inventor:
Orrin B. Peck.
By Banning & Banning & Payson,
Attys.

(No Model.) 5 Sheets—Sheet 3.
O. B. PECK.
PROCESS OF SEPARATING POWDERED OR FINELY DIVIDED PARTICLES.

No. 479,953. Patented Aug. 2, 1892.

Witnesses:
Inventor:
Orrin B. Peck,
By Banning & Banning & Payson,
Attys

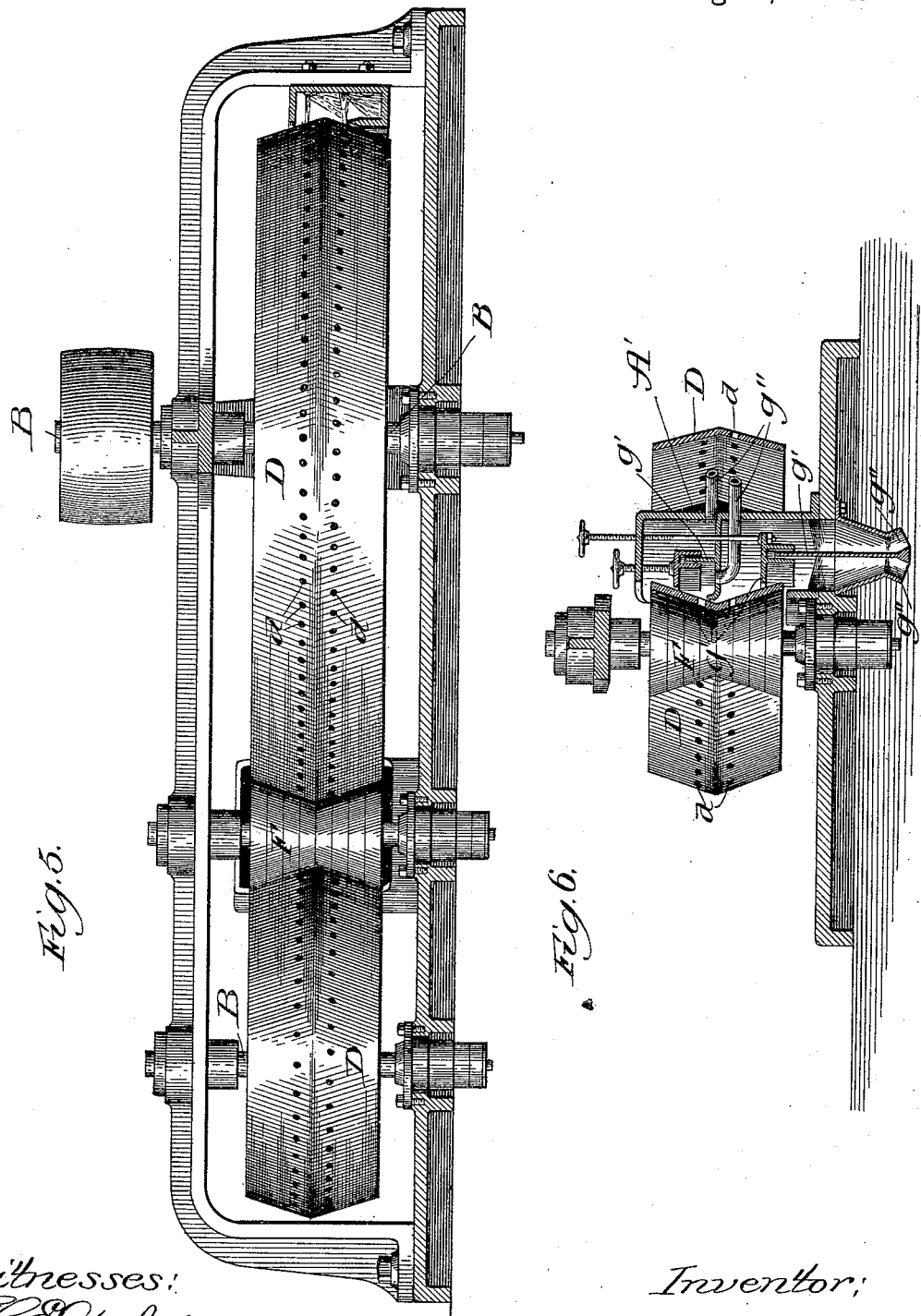

(No Model.)
5 Sheets—Sheet 5.
O. B. PECK.
PROCESS OF SEPARATING POWDERED OR FINELY DIVIDED PARTICLES.
No. 479,953.
Patented Aug. 2, 1892.
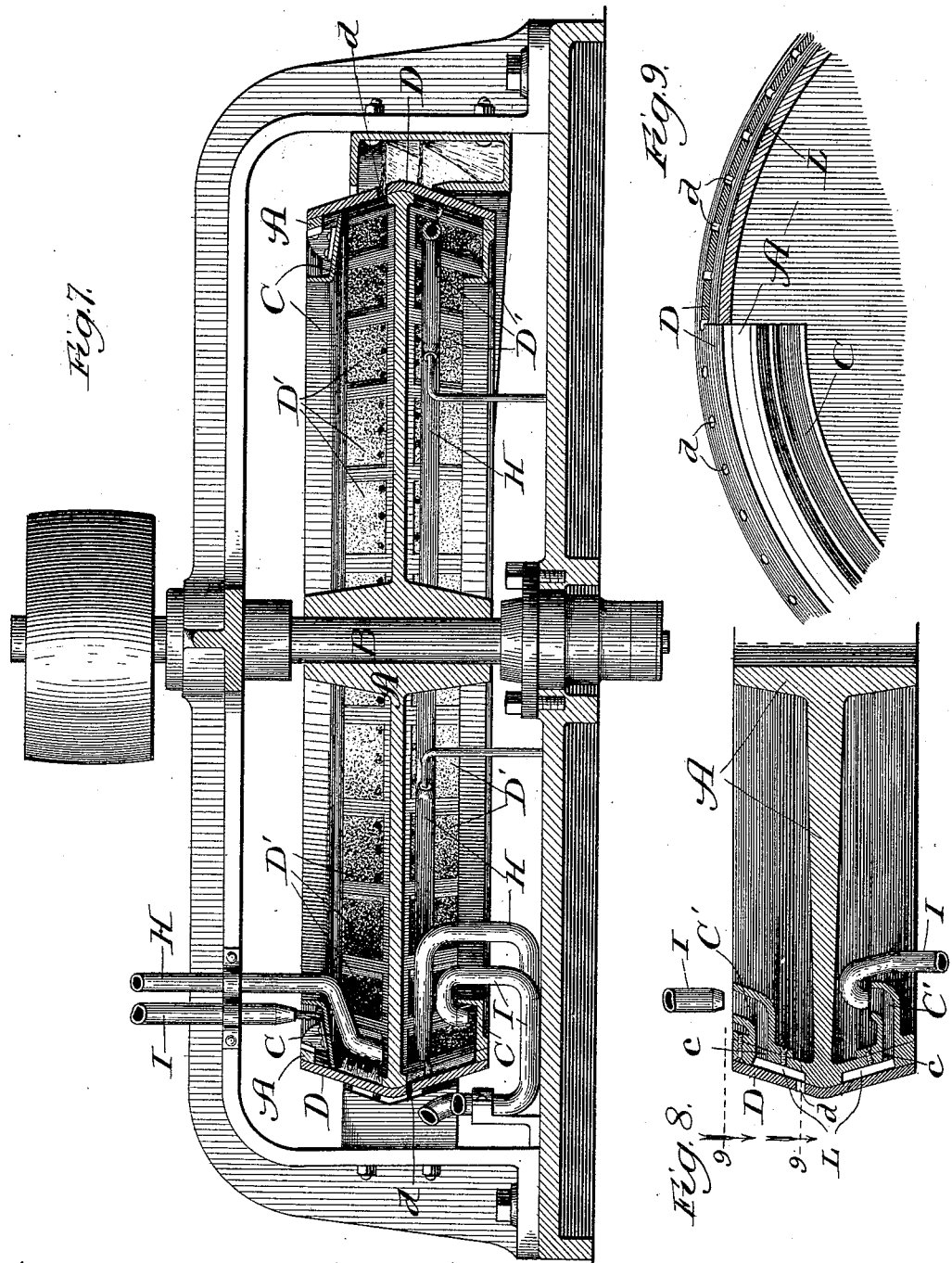

UNITED STATES PATENT OFFICE.

ORRIN B. PECK, OF CHICAGO, ILLINOIS, ASSIGNOR TO MELINDA PECK, OF SAME PLACE.

PROCESS OF SEPARATING POWDERED OR FINELY-DIVIDED PARTICLES.

SPECIFICATION forming part of Letters Patent No. 479,953, dated August 2, 1892.

Application filed January 11, 1892. Serial No. 417,683. (No specimens.)

*To all whom it may concern:*

Be it known that I, ORRIN B. PECK, a citizen of the United States, residing at Chicago, Illinois, have invented a certain new and useful Process of Separating Powdered or Finely-Divided Particles, of which the following is a specification.

Figure 1:
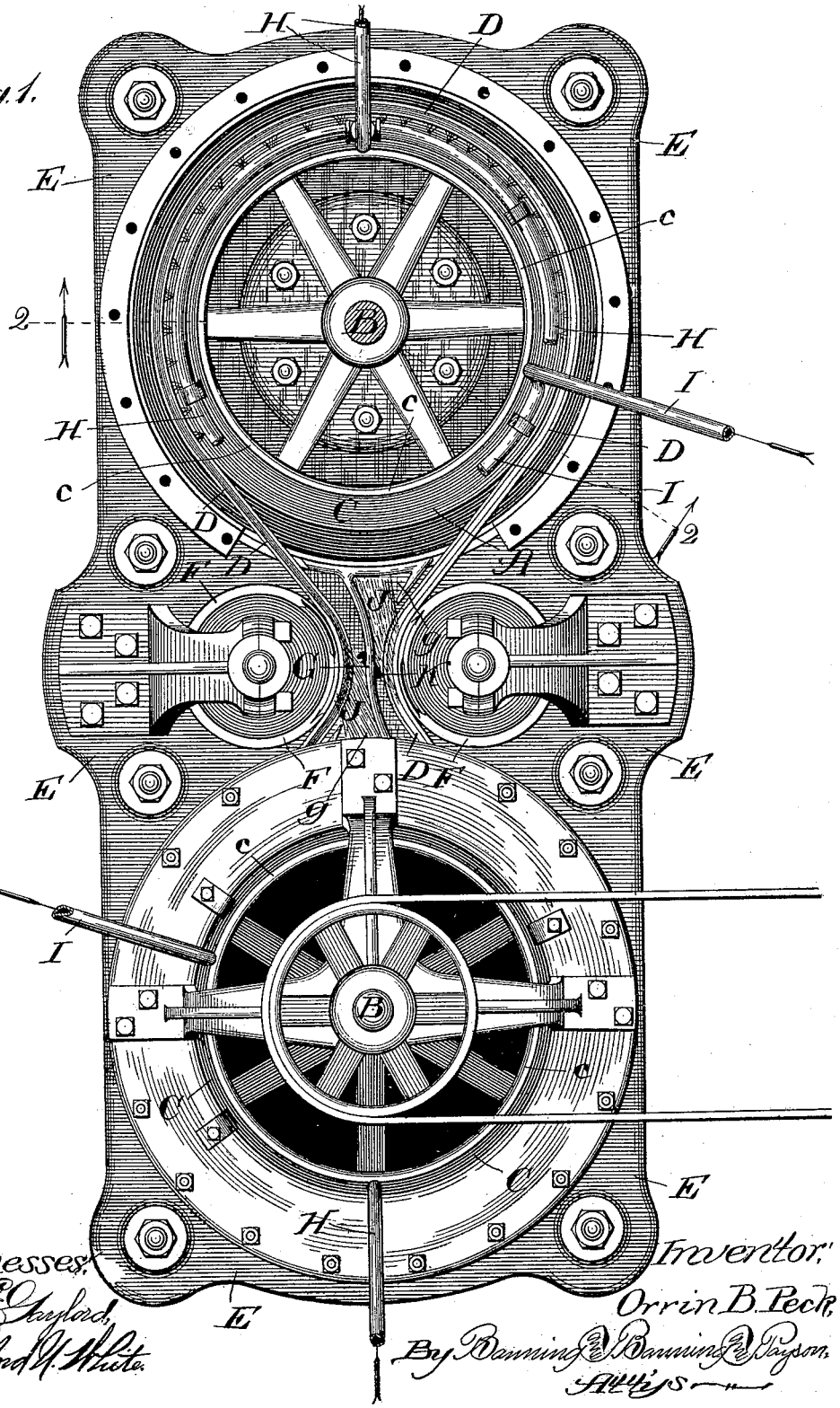
Figure 2:
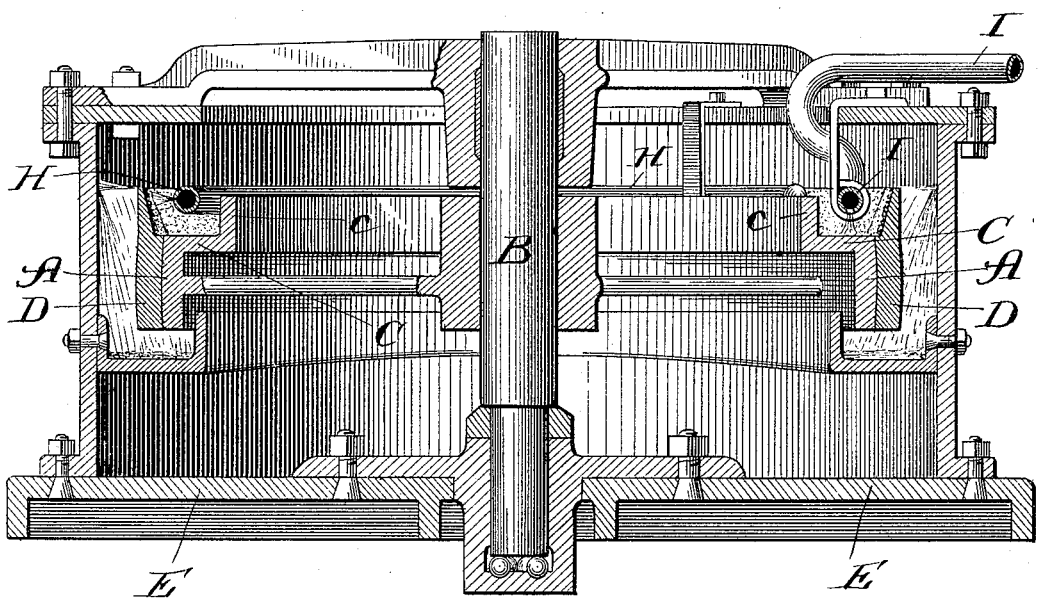
Figure 3:
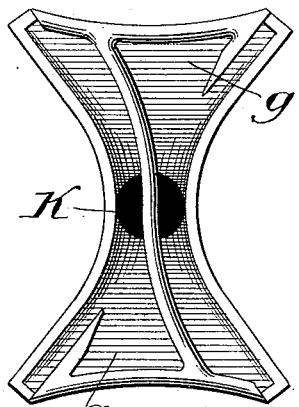
Figure 4:
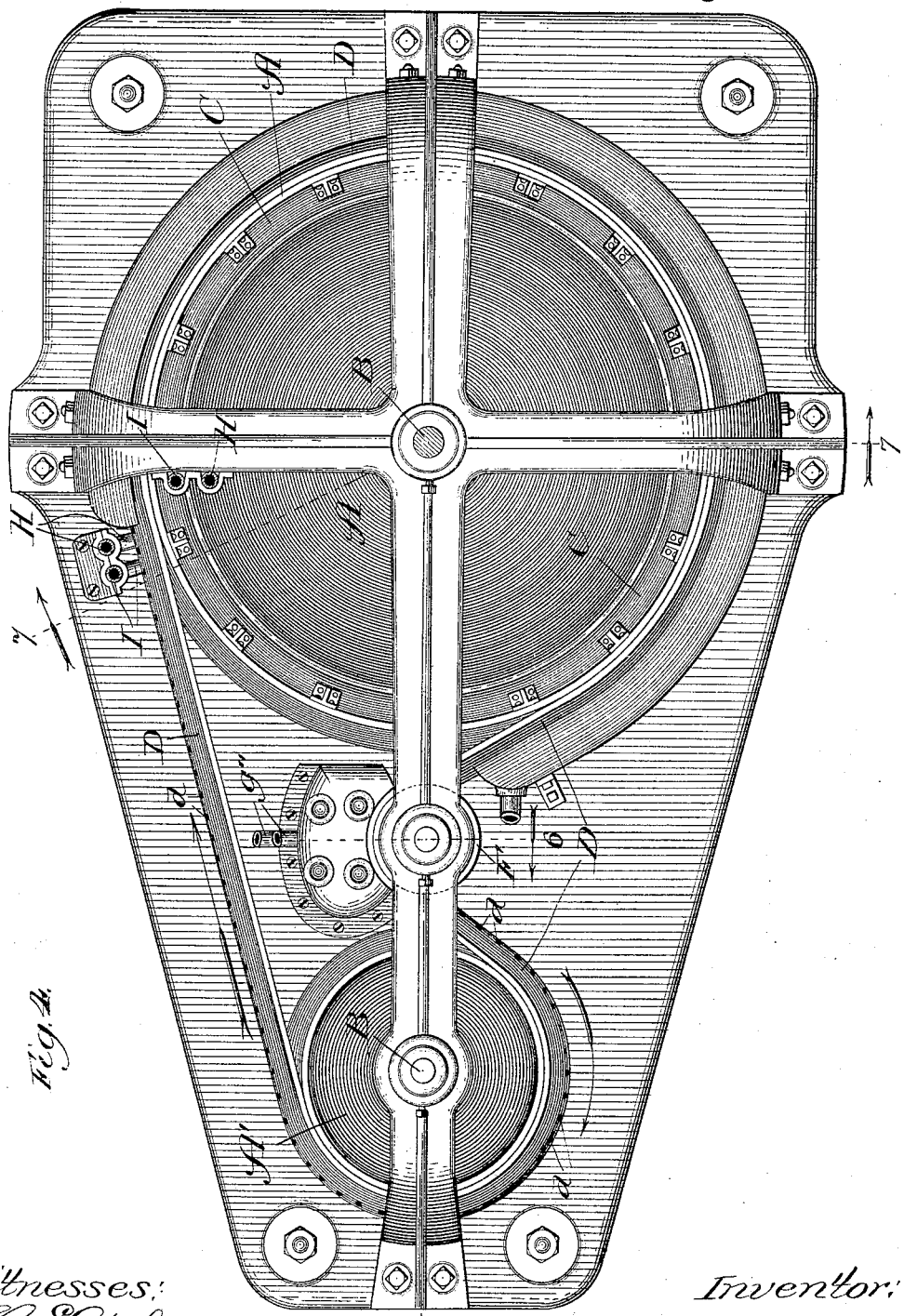

In the drawings, Figure 1 is a plan view of an apparatus for carrying out my process with the cover removed from one of the parts. Fig. 2 is a vertical section taken on the line 2 of Fig. 1, looking in the direction of the arrows. Fig. 3 is a plan view of a detail hereinafter described. Fig. 4 is a plan view of a modified apparatus for carrying out my process. Fig. 5 is a partly-sectional side elevation on the line 5 of Fig. 4. Fig. 6 is a cross-sectional elevation taken in the line 6 of Fig. 4. Fig. 7 is an enlarged sectional view on line 7 of Fig. 4. Fig. 8 is a sectional view of one-half of a modified form of a wheel, and Fig. 9 is partially a plan and partially a sectional plan view taken on lines 9 9 of Fig. 8.

In carrying out my process of separating powdered or finely-divided particles containing mineral-bearing substances of different degrees of specific gravity I make a pulley A, preferably of large diamter, mounted on and revolved by a rotatable shaft B, which may be rotated by a pulley at its top or in any other suitable way. The top of the pulley A is provided with an inwardly-extending flange C, with an upwardly-extending rim c, which is carried up a desired distance. A belt D, made of any suitable material and with its inner upper surface preferably beveled or chamfered to present a separating-surface, preferably inclined, is arranged on the pulley and extended far enough above the same to present a sufficient separating-surface. It also makes between the uprising rim of the pulley and the separating-surface of the belt an annular channel in which the material to be treated may be deposited. Of course, if desired, the uprising rim c of the pulley may be dispensed with, as the action of centrifugal force would carry the material under treatment outward, and thus render the uprising rim of the pulley unnecessary. I arrange two of these pulleys in near juxtaposition to each other, as shown in Fig. 1, and preferably mount them both on the same bed-plate E. Between the pulleys A are preferably arranged idlers F, which bear against the outer surface of the belt between the main pulleys A and bring the sides of the belt close together, so that as the belt passes around the idlers its direction or course is abruptly changed as it spreads out again to encircle the pulleys A. Between the main pulleys and between the idlers is arranged a partition G, provided with pockets g, as particularly shown in Fig. 3, adapted to catch the material thrown off from the belts while passing around the idlers, as hereinafter described. A water-spraying pipe H is arranged within the separating-surface of the belt and preferably carried around the greater portion of its circumference in each pulley.

A material-supply pipe I is arranged to deposit the material to be treated on the receiving surface or flange C of the pulley A at or near the point where the belt first engages with the pulley after leaving the idlers in the course of its travel. The material deposited on the receiving surface or flange of the pulley is carried by the action of centrifugal force against the separating-surface of the belt and up along the same as it travels in its course around the pulley, where it is subjected to the gently-spraying water from the water-pipe H, which assists the action of centrifugal force in driving and throwing off the lighter particles of the material being treated. Heavier particles adhering to the separating-surface of the belt are carried in its travel to the point where it passes around the idler and its course abruptly changed, when they are thrown off from the surface of such belt at a tangent by the action of centrifugal force, as shown at J in Fig. 1. The particles thus thrown off are caught in the pockets of the partition G, which is provided with a bed-plate inclining to a hole K, to which the material slides and through which it passes to the desired place to be secured. The removal of the heavier particles from the separating-surface of the belt is rendered easy from the fact that as soon as the belt leaves the pulley and ceases to travel in a circle the particles are no longer held against it by the action of centrifugal force. In other words, centrifugal force ceases to be developed and to operate on the particles to cause them to adhere to that portion of the belt which has ceased to travel in a circle, so that the particles may be readily removed. Instead of using idlers, therefore, to cause the particles adhering to the belt to be thrown off from its surface, other means may be employed to remove the particles from the belt, as described in an application, Serial No. 417,684, simultaneously filed herewith for the novel features of the apparatus.

It is obvious that various changes can be made in the mechanical means employed for carrying out my process, and I do not, therefore, desire to be considered as limiting myself to the details of construction of the mechanism used.

In order to illustrate some of these changes I have shown a modified arrangement in Fig. 4. In this modification I use a pulley A, preferably largest at the center or crowning, so that the encircling belt will slant from its edges outward toward its center line and present two separating-surfaces, one above and one below the center of the pulley and inclining outward in that direction. The rim of this pulley is largely cut away, making a framework of it. Instead of using another large pulley to operate in conjunction with the pulley A, I prefer to use a smaller pulley A', mounted upon a shaft and sustained in journals. This pulley may be of any ordinary design of suitable width and size to carry the belt passing around it. I then provide the idler F, which I prefer to make inclining to its center, as shown. Around the pulley or framework A and the pulley A', and passing inside of the idler F, I mount or place the belt D. This belt I preferably provide with rows of perforations $d$ along near its central portion, as shown, through which the lighter material or the larger portion of it and the water may escape. The belt is made or provided with an inside surface, preferably of smooth rubber, to present or afford a suitable separating-surface, which will be exposed or presented to receive material to be separated where the rim of the pulley is cut away, which portion I have indicated by the letter D', Fig. 7. By means of the annular channels or distributing-plates C, secured on the pulley or frame, as shown, supplied by the feed-pipes I and the spray-pipes H, material and water may be deposited on the surfaces of the belt presented through the openings in the rim of the pulley or framework, and the lighter particles driven by the action of centrifugal force and water across toward the portion or edge of the separating-surface farthest from the axis of rotation and in the direction where the perforations are, through which all or a portion of the same will escape. The water-supply pipes H are perforated and arranged to spray the desired amount of water on the surface of the belt, where it is required to assist in washing and separating the materials on the separating-surface. The pockets to which heavier and adhering material is carried, and receptacles into which it is thrown through the change of course of travel of the belt, are preferably provided with a number of horizontal partitions into which the material from different horizontal positions on the belt will be thrown and caught, so that as there may be differences in the degree of richness of the material on different planes on the surface of the belt it will be caught in separate receptacles or in a divided manner, whence it may be led off by pipes or chutes, as desired, to the place of deposit. I have designated these partitions by the letters $g'$ and the pipes or chutes through which the material is taken off by the letters $g''$.

In Figs. 8 and 9 I have illustrated a further modification. In this modification I make a pulley grooved, hollowed out, or depressed on a portion of its face, leaving, however, a sufficient portion of the face raised and adapted to engage and carry or drive the belt. In this way there are spaces or chambers L between the outside surface or face of the pulley, where it is depressed, and the inside surface of the belt, into which material to be separated may be introduced or passed and deposited on the separating-surface of the belt. The inside surface of the belt used in this modification, as in the one above described, is made in a way to afford a suitable separating-surface, and is mounted around the pulley, as in the former instance. The pulley is also largest at the center, so that the action and travel of the material being separated is substantially the same. Through means of the annular channels or trough C', the holes or passages $c$, and the supply-pipes I the materials to be separated are introduced in the spaces or chambers L and on the separating-surface of the belt.

I do not wish to here claim the particular mechanism comprising the modified means shown and described herein, as I wish to make them the subject of other applications.

Where the process is carried on with the employment of pulleys and idlers, as illustrated in the accompanying drawings, centrifugal force is alternately developed in a direction against or toward the separating-surface of a portion of the belt and then from it, depending upon what part or place in the course of its travel such portion may be traveling through, and at all times while the belt is traveling by means of the pulleys and idlers centrifugal force is acting on or against one side of a portion of it, so to speak, and at the same time on or against the opposite side of another portion of it. It will be seen, however, that the process described may be carried out by various modifications in the particular form and arrangement of apparatus that may be employed to practice or embody it; but in all cases the material is deposited on the belt while it is traveling in a circular direction.

Some of the mechanical means employed for carrying out my process are described and claimed in an application filed by me May 31, 1892, and serially numbered 434,970; and I do not therefore claim such mechanism herein.

What I regard as new, and desire to secure by Letters Patent in this specification, is—

1. The process of separating powdered or finely-divided particles containing mineral-bearing substances of different degrees of specific gravity, which consists in depositing the material to be separated on the separating-surface of a traveling belt and first subjecting them to the action of centrifugal force in a direction toward the separating-surface of the belt and afterward subjecting the particles adhering to the belt to the action of centrifugal force in an opposite direction to throw them off from the separating-surface, substantially as described.

2. The process of separating powdered or finely-divided particles containing mineral-bearing substances of different degrees of specific gravity, which consists in depositing the particles of material to be treated on the surface of a belt where it is traveling in a circular direction and carrying the particles which adhere to the belt to a point where it ceases to travel in a circular course, where they are thrown off by the reversal of the direction of action of the centrifugal force, substantially as described.

3. The process of separating powdered or finely-divided particles containing mineral-bearing substances of different degrees of specific gravity, which consists in causing the lighter particles to be carried by the action of centrifugal force across the surface of a belt where it is traveling in a circular direction to a point of discharge and carrying the heavier particles on the belt to a point where it ceases to travel in a circular course, where they are removed, substantially as described.

ORRIN B. PECK.

Witnesses:
THOMAS A. BANNING,
MARIE L. PRICE.